Patented Nov. 21, 1950

2,531,134

UNITED STATES PATENT OFFICE 2,531,134

DIMETHYL PHTHALATE SOLUTION OF ACETYL PEROXIDE AS CATALYST FOR TRIFLUOROCHLOROETHYLENE POLYMERIZATION

Edward L. Kropa, Old Greenwich, and John J. Padbury, Stamford, Conn., assignors to American Cyanamid Company, New York, N. Y., a corporation of Maine No Drawing. Application March 12, 1946, Serial No. 653,960

2 Claims. (Cl. 260—92.1)

This invention relates to polymers of halogen substituted ethylenes wherein all of the hydrogens are substituted by at least two different halogens, at least two of the substituents being fluorine. This invention also relates to processes for polymerizing the aforementioned halogen substituted ethylenes. This invention is especially directed to polymers of trifluorochloroethylene and to processes of polymerizing trifluorochloroethylene.

There are many polymers of halogenated ethylene compounds and they have widely varying properties. According to the literature and other reports tetrafluoroethylene polymers are so infusible at temperatures up to red heat that they are not readily manipulated and formed into various shapes by conventional procedures such as molding, pressing, extruding, etc. Drawing and orientation is at best very difficult. On the other hand, the 1-chloro-1-fluoroethylene polymers are soluble and fusible and therefore they are not suitable for the formation of crystalline oriented filaments or sheets. Furthermore, inasmuch as they contain both hydrogen and halogen they tend to liberate the halogen acid upon heating to moderately high temperatures such as those at which the polymers may be molded. Accordingly, this limits their use in molding and extrusion where the liberation of halogen acids at the elevated temperatures necessary for forming the materials would be undesirable because of its corrosive effect on the apparatus employed, and because the decomposition would result in inferior products. The lack of heat resistance also limits the temperature to which the material may be heated during extrusion operations and hence this limits the size of filaments that may be extruded to those which are relatively large in diameter.

Readily fusible, non-crystalline polymers may be obtained from either cis- or trans-1-fluoro-2-chloroethylene but these polymers are not solvent resistant since they are soluble in substances such as beneze. Furthermore, these polymers are not heat stable for the same reasons as those mentioned in connection with the 1-chloro-1-fluoroethylene polymers.

Vinylidene chloride has been polymerized either alone or with vinyl chloride to form crystalline materials which may be oriented, but it has many disadvantages such as a lack of high heat resistance.

It is now apparent that the halogen substituted ethylene polymers which are available or which have been proposed have certain disadvantages. Thus, tetrafluoroethylene polymers are difficult to shape and orientation is also difficult, while the halogen substituted ethylenes containing hydrogen have limited heat stability and in many cases are non-crystalline and/or they are not resistant to solvents. Thus none of the polymers of the halogen substituted ethylenes heretofore produced, have a combination of high heat resistance, chemical resistance, solvent resistance, the ability to be easily shaped by molding, pressing, extruding, etc., together with crystallinity and the property of forming oriented polymers upon cold-drawing.

Certain of these compounds, such as vinylidene fluoride, are not readily polymerized. Accordingly, it is apparent that the polymerization of the halogen substituted ethylenes and the type of polymers formed are unpredictable.

Previously it has not been possible to produce polymers of high molecular weight by the polymerization of trifluorochloroethylene and furthermore, it has not been possible to obtain any substantial yield of the polymers of trifluorochloroethylene. The same applies to similar halogen substituted ethylenes which may be polymerized in accordance with this invention.

One object of the present invention is to provide polymers having high heat resistance, high chemical resistance, high solvent resistance, and further characterized by their ability to be shaped by molding, pressing, extruding, etc., and by their crystallinity and their ability to be oriented by cold drawing.

Another object of the present invention is to provide processes wherein high yields of polymers having the properties mentioned in the preceding object are obtained.

A further object of the present invention is to provide an improved process for the manufacture of polymers of trifluorochloroethylene and other halogen substituted ethylenes containing fluorine substitutents, no hydrogen atoms and having one halogen substituent other than fluorine.

Another object of the present invention is to provide high molecular weight polymers of trifluorochloroethylene and the halogen substituted ethylenes mentioned above.

Still another object of the present invention is to provide polymers of trifluorochloroethylene which are crystalline.

A further object of the invention is to provide polymers of trifluorochloroethylene which are crystalline and oriented.

One important object of this invention is to prepare polymers of trifluorochloroethylene in various different crystalline forms.

A still further object of the present invention is to provide polymers which may be cold-drawn to form strong filaments or films.

These and other objects are attained by polymerizing a halogen substituted ethylene having no hydrogen atoms, all of the substituents being halogen, the substituents including at least two different halogens and including at least two fluorine atoms, and more particularly, trifluorochloroethylene in the presence of an organic peroxide catalyst which is an alkyl hydroperoxide, a dialkyl peroxide, a diacyl peroxide (at least one acyl group of which is aliphatic) or a monoalkyl-monoacyl peroxide and at a temperature below the critical temperature of said halogen substituted ethylene. Preferably, the polymerization is carried out by polymerizing at a temperature between about 15° and about 50° C. and still more preferably at a temperature of about 25° C. The suitable organic peroxide catalysts are those which have at least one aliphatic substituent and preferably those having none or only one aromatic substituent. Furthermore, the peroxide catalysts which generally produce high yields of polymer are those having aliphatic acyl or alkyl groups containing from 1 to 8 carbon atoms. The polymerization is preferably carried out under the pressure generated by the compound being polymerized when contained in a closed vessel during the polymerization, but high pressures ranging from several atmospheres up to 100 or even 500 atmospheres may be used if desired. Orientation is accomplished by cold-drawing, that is, stressing the polymer at a temperature below its melting point.

In order to obtain the various different oriented crystalline forms of polymers of trifluorochloroethylene, and in order to obtain products differing in physical properties, the type of catalyst and the amount thereof is varied. Thus, for example, the use of diacyl peroxides, such as acetyl peroxide, results in the production of polymers which when oriented by drawing have a higher degree of orientation than oriented polymers obtained by the polymerization of trifluorochloroethylene in the presence of an alkyl hydroperoxide or a dialkyl peroxide. That the polymerization mechanism is different when the alkyl peroxide is employed from that when the acyl peroxide is used, is emphasized by the difference in the effects of varying amounts of these catalysts. Thus when the amount of an acyl peroxide is increased the plasticity drops, whereas when the amount of an alkyl hydroperoxide is increased the plasticity increases. Aside from the changes in physical properties of the polymers, the amount of catalyst employed does not affect the nature of the polymerization to any marked degree. Generally, small amounts of catalysts are preferable, but larger amounts may be used if desirable, particularly in order to obtain products having certain desirable physical properties.

Mixtures of one, two, three or any other number of the halogen substituted ethylenes having no hydrogen atoms, all of the substituents being halogen, the substituents including at least two different halogens and including at least two fluorine atoms, may be polymerized in accordance with our invention, and the polymerization is preferably carried out at a temperature below the critical temperature of each of the substituted ethylenes, but in some cases the polymerization may be carried out at a temperature below the critical temperature of any one of the mixture of substituted ethylenes. In this way, polymerization occurs essentially in the liquid phase. Our process is not to be confused with the vapor phase polymerizations which are often employed in the polymerization of ethylene, tetrafluoroethylene, and other halogen substituted ethylenes where the polymerization occurs in the vapor phase or possibly in a solid-gas system. Our polymerization proceeds essentially in the liquid phase, and when mixtures of the polymerizable substances are used, the copolymerization occurs either in the mixture of liquids if the temperature is below the critical temperature of all of the polymerizable substances, or in the solution containing any of the polymerizable substances whose critical temperature is below the reaction temperature dissolved in a polymerizable substance having a critical temperature above the reaction temperature.

The following examples, in which the proportions are in parts by weight, are given by way of illustration and not in limitation. The proportion of peroxide catalyst specified is in each case based upon 100% pure peroxide although the peroxides are often used as a dilute solution.

EXAMPLE 1

Trifluorochloroethylene is distilled through a packed fractionating column having the equivalent of about 23 theoretical plates to obtain a product having a boiling point of about −28° C. About 60 parts of the distilled trifluorochloroethylene are placed in a pressure vessel together with about 0.3 part of tertiary butyl hydroperoxide. The vessel is sealed and the polymerization is allowed to take place for about 13 days at a temperature of about 25° C. After removing the unreacted monomer by evaporation from the polymer thus produced, a white, porous material remains. The unreacted monomer is desirably recovered by condensation. This material is extracted with hot acetone, and after drying, about 35 parts of polymeric product are obtained. This product softens above 200° C. on a hot plate and becomes transparent, rubbery and readily workable at about 265° C. Furthermore, it does not discolor at this temperature. The fused polymer after cooling is transparent, tough and flexible. This polymer may be heated to 265° C., allowed to cool, and drawn into filaments which are stronger and more flexible than the undrawn polymer. X-ray diffraction patterns show that the drawn polymer undergoes orientation in the direction in which it is drawn. The polymer may be extruded in a Peakes-Rossi machine at a pressure of 1500 p. s. i. at a temperature of 173° C. and at a rate of about 0.09 inch per minute.

EXAMPLE 2

About 60 parts of trifluorochloroethylene distilled in accordance with Example 1, together with 0.3 part of tertiary butyl hydroperoxide are polymerized in a closed pressure vessel by maintaining at a temperature of about 50° C. for about 5 days. About 25 parts of a powdery white polymer are obtained in accordance with the procedure of Example 1 and the polymer has properties similar to the product of Example 1.

EXAMPLE 3

100 parts of trifluorochloroethylene are polymerized in a pressure vessel in the presence of 0.5 part of dilauric peroxide. The polymerization is carried out at about 25° C. for 20 days and a yield of about 33% of a polymer similar to those described above is obtained. At 2500 p. s. i. and a temperature of 200° C. in a Peakes-Rossi machine, the polymer extruded 0.80 inch within 2 minutes.

EXAMPLE 4

About 100 parts of trifluorochloroethylene, together with 0.5 part of 1-hydroxycyclohexyl hydroperoxide-1 is polymerized in accordance with Example 3 to produce about 28% of the theoretical yield of a polymer having properties similar to those of the product of Example 3. At 2500 p. s. i. and a temperature of 200° C. in a Peakes-Rossi machine, the polymer extruded 0.86 inch within 2 minutes.

EXAMPLE 5

100 parts of trifluorochlorethylene and 0.5 part of tertiary butyl perbenzoate, i. e., $$(CH_3)_3COO-CO-C_6H_5$$

are placed in a pressure vessel and maintained at about 25° C. for about 20 days. About 24% of the theoretical yield of a polymer having properties similar to those obtained in accordance with the previous examples is obtained. This polymer extruded at a rate of 0.82 inch under conditions similar to Example 4.

EXAMPLE 6

60 parts of trifluorochloroethylene and 0.22 part of di-tertiary butyl peroxide are placed in a closed pressure vessel and the polymerization of the trifluorochloroethylene is allowed to proceed for about 24 days while maintaining a temperature of about 25° C. A white polymer which is formed is extracted with acetone after the unreacted monomer is removed and the residue is extracted with acetone leaving a white powder. This powder which is a high molecular weight polymer melts very slowly when placed upon a Dennis-Shelton bar and requires more than 10 minutes to melt at a temperature of 206° C. A yield of about 28 parts of the polymer is obtained (47% of the theoretical yield). The polymer is quite heat resistant and may be heated to 330° C. without any apparent decomposition. The polymer may be fused by heating at about 300° C. and it may then be drawn into fibers. These fibers have an X-ray diffraction pattern characteristic of a highly oriented crystalline polymer.

EXAMPLE 7

A polymer made in accordance with the procedure of Example 1, except that the polymerization is carried out for only 20 days, is molded in the form of a standard A. S. T. M. ½" x ½" x 5" bar at 250° C. and at a pressure of 2 tons per square inch. A well-molded bar having a smooth, glossy surface, and being chemically resistant and heat resistant is obtained, and when immersed in boiling water under no load for 1 hour no distortion occurs. However, when a kilogram load is suspended, in cantiliver form, 4 inches from one end and the bar boiled for an additional 3 hours, some slight distortion occurs.

EXAMPLE 8

100 parts of trifluorochloroethylene and 0.5 part of dicaprylyl peroxide, i. e., $(C_7H_{15}CO)_2O_2$, is polymerized in a closed vessel at 25° C. for 20 days. The monomer is removed and the polymer is extracted with acetone leaving the polymeric product as a white crystalline polymer. About 49% of the theoretical yield is obtained.

EXAMPLE 9

100 parts of trifluorochloroethylene, together with 0.5 part of diacetyl peroxide are polymerized in a closed pressure vessel at a temperature of 25° C. for about 20 days. Inasmuch as diacetyl peroxide is explosive in its pure form, this compound is introduced into the trifluorochloroethylene as a solution. A suitable solution is one containing about 29.6% of diacetyl peroxide dissolved in dimethyl phthalate and having an available oxygen content of about 4%. The amount of solvent is not critical and may be varied widely. However, generally it is preferable to use only sufficient solvent to form a homogeneous solution with the diacetyl peroxide. After completion of the polymerization reaction, the unreacted monomer is removed by distillation and the polymeric residue is extracted with acetone. The purified product is a white powder similar to those obtained in accordance with the preceding examples. A yield of about 85% of that theoretically possible is obtained. At 2500 p. s. i. and a temperature of 200° C., the polymer extruded 0.47 inch within 2 minutes.

EXAMPLE 10

894 parts of trifluorochloroethylene are passed slowly through a soda lime tower and condensed in a Pyrex glass receiver cooled by any suitable means, such as by Dry Ice. About 3.3 parts of tertiary butyl hydroperoxide are incorporated into the purified trifluorochloroethylene and placed in a pressure vessel which is sealed and the polymerization of the trifluorochloroethylene is permitted to take place at about 25° C. for 20 days. The unreacted monomer is distilled off and the solid white polymer which remains as a residue is extracted with acetone. A yield of about 518 parts of purified polymer is obtained, having a plasticity, as determined by the procedure described in Example 9, of 0.70 inch.

A polymer obtained in the manner described above is extruded through a $\frac{1}{32}$" orifice at a temperature of about 240–250° C. and a pressure of 2000 p. s. i. Continuous tension is applied to the coarse filament as it emerges from the orifice resulting in the reduction of the diameter to 90–100μ. The drawn filament is lustrous and transparent and is strong and flexible. The filaments exhibit a high order of birefringence and the third order colors are readily apparent. Alternatively, the polymer may be extruded in the form of a coarse filament and allowed to cool to room temperature. When immersed in live steam, the coarse filament could be drawn into a finer filament. X-ray diffraction analysis indicates that the fiber is characterized by multiple split arcs.

EXAMPLE 11

Into each of two pressure vessels are charged 120 parts of trifluorochloroethylene and 0.18 part of t-butyl hydroperoxide. To one of the vessels is also added 20 parts of distilled water. The polymerizations are allowed to proceed at 25° C. for 20 days, after which the vessels are opened and the polymers isolated. The polymer prepared in the absence of water has a plasticity of 0.52 inch in 2 minutes at 200° C. and 2500 p. s. i., while the polymer prepared in the presence of water has a plasticity of 0.96 inch in 2 minutes at 200° C. and 2500 p. s. i., the plasticity in each case being measured in a Peakes-Rossi machine.

EXAMPLE 12

A glass vessel, capable of withstanding pressure, is charged with 50 parts of trifluorochloroethylene, 50 parts of distilled water, 2.5 parts of dodecylamine formate, and 10 parts of an aqueous solution containing 3% by weight of hydrogen peroxide. The polymerization vessel is agitated in a bath at about 50° C. for 92 hours. The vessel is cooled, the unreacted monomer vented, and the remining contents of the vessel poured into methanol to precipitate the polymer. After washing and drying the polymer, there is obtained 1.5 parts of material in the form of a fine, white powder. In place of the hydrogen peroxide, other water-soluble peroxides may be employed, such as potassium persulfate, sodium perborate and potassium percarbonate.

EXAMPLE 13

In suitable pressure equipment, 57,700 parts of trifluorochloroethylene is polymerized in the presence of 0.5% by weight of acetyl peroxide for 25 days at 25° C. After venting unreacted monomer, there is obtained 52,300 parts of white polymer. The polymer thus obtained is coarse-ground in an impact cutter, extracted with acetone and dried thoroughly in a vacuum oven at 75° C. Standard ½" x ½" x 5" test bars are molded from the polymer of trifluorochloroethylene in a commercial injection molding machine by forcing the polymer heated to a temperature of about 480° F. under a pressure of about 29,000 pounds per square inch into a cooled mold maintained at about 165° F.

The following properties were observed for the molded test bars:

Specific gravity _____ 2.1
A. S. T. M. heat distortion, ° C _____ 75–82
Flexural strength, p. s. i _____ 4300–5400
Impact strength (Izod), ft. lbs./in _____ 0.98–1.58

The sprues, gates and other scrap from the injection molding operation are ground in an impact cutter and remolded. Other samples of the scrap are heated to 400–600° C. in a suitable apparatus, whereby the scrap is cracked to lower molecular weight material. From this cracking process, 60% of the high molecular weight polymer is converted into the monomer ($CF_2=CFCl$), while the remainder is converted to dimer, trimer, tetramer and other polymer spices.

EXAMPLE 14

Trifluorochloroethylene is polymerized in glass-lined pressure vessels under the following conditions:

| Run No. | Catalyst Composition | Parts | $CF_2=CFCl$ Parts | Time, Days | Temp., °C. | Yield of Polymer, Per Cent |
|---|---|---|---|---|---|---|
| 1 | t-Butyl hydroperoxide 52.7% conc. | 5 | 1,036 | 40 | 25.0 | 40.5 |
| 2 | t-Butyl perbenzoate | 5 | 1,008 | 40 | 25.0 | 49.6 |
| 3 | Acetyl peroxide 30% conc. | 10 | 602 | 14 | 25.0 | 79.5 |

The polymer from each experiment is ground, extracted and dried thoroughly. Samples of the different polymers are molded into flat sheets in a press, the platens of which are heated to 225° C. The polymers obtained from runs Nos. 2 and 3 may be formed into flexible, transparent sheets, free from bubbles. However, a sheet obtained by molding the polymer prepared by using t-butyl hydroperoxide as a catalyst is less flexible and is opaque due to the presence of numerous small bubbles, indicating lower thermal stability than the polymers prepared with the other catalysts used in runs Nos. 2 and 3.

EXAMPLE 15

Trifluorochloroethylene is polymerized in glass under the pressure generated by itself at 25° C. in sealed vessels. In each case, 0.5% by weight of catalyst is used. The relative plasticities of polymer samples are determined by means of a Peakes-Rossi machine, using modifications of the usual temperature and pressure. The figures given refer to the inches of flow in 2 minutes at 200° C. and 2500 p. s. i.

| Catalyst | Plasticity |
|---|---|
| t-Butyl hydroperoxide | 1.65 |
| Acetyl peroxide | 0.55 |

EXAMPLE 16

Trifluorochloroethylene is polymerized with different catalysts in the presence and in the absence of air. The polymerization reactions are conducted in sealed glass containers at 25.0° C. for the times indicated. In each run, 0.5% by weight of catalyst is used.

| Run No. | Catalyst | Time, Days | Yield of Polymer, Per Cent | Conditions |
|---|---|---|---|---|
| 1 | t-Butyl hydroperoxide | 20 | 52.8 | Vacuum. |
| 2 | do | 20 | 55.6 | Air present. |
| 3 | Acetyl peroxide | 14 | 79.6 | Vacuum. |
| 4 | do | 14 | 57.5 | Air present. |

From these results it is apparent that the polymerization reaction is affected markedly when air is present and when an acyl peroxide is employed, whereas air causes little or no effect when the alkyl type of peroxide is used.

EXAMPLE 17

The influence of catalyst concentration on the plasticity, as determined in a Peakes-Rossi machine, of polytrifluorochloroethylene is shown in the following table:

| Catalyst | | Plasticity Flow in 2 minutes at 200° C. and 2500 p. s. i. |
|---|---|---|
| Composition | Per cent by weight of monomer | |
| t-Butyl hydroperoxide | 0.079 | 0.49 |
| Do | 0.158 | 0.52 |
| Do | 0.632 | 2.1 |
| Acetyl peroxide | 0.083 | 0.68 |
| Do | 0.167 | 0.53 |
| Do | 0.333 | 0.48 |
| Do | 0.667 | 0.46 |

EXAMPLE 18

Polytrifluorochloroethylene is rolled in a ball mill for 24 hours. The polymer is screened and 60 parts of polymer passing a 100-mesh sieve is ball-milled with 600 parts of naphtha for 17 hours. Sheets of glass and metal are coated with the dispersion of polymer, the solvent is evaporated and the deposit of polymer is baked at 200° C. for one-half hour. Under this treatment, the polymer sinters, giving continuous films.

EXAMPLE 19

A polymer produced in accordance with Example 9 is heated at about 260° C., quenched and cold-drawn to yield a coarse filament about 425μ in diameter. The filament may be separated longitudinally into fine filaments, some of which are about 50–60μ in diameter and others which are 3–4μ in diameter. These fibers are strong and flexible. An X-ray diffraction pattern shows that they are highly oriented along the fiber axis, and the pattern is characterized by a single split arc. Furthermore, the filaments may be tied into hard knots and they are transparent and substantially water-white.

EXAMPLE 20

Highly transparent sheets of polymer can be obtained by very rapid cooling of the hot polymer. Sheets of polytrifluorochloroethylene are molded between thin stainless steel plates heated to 230° C. The sandwich arrangement of hot plates and polymer are taken from the press and quenched immediately in cold water. The metal plates are removed from the resulting sheet of polymer which is colorless, optically strain-free and highly transparent. This product is amorphous as shown by X-ray diffraction analysis. When the polymer is allowed to cool slowly from the molding temperature, e. g. 1 to 5 minutes, a translucent, amorphous sheet of polymer results. Such samples of translucent polymer can be made transparent by heating to 200–250° C. for several minutes, and then cooling rapidly. This polymer remains transparent at room temperature.

Injection molded specimens of thin cross section are also clear and transparent, being under conditions of molding, quenched by the cooler mold.

By passing opaque sheets through calender rolls, a certain amount of transparency can be achieved. This is believed to arise from the distortion of the voids during the drawing. Furthermore, by cold-drawing to a moderate degree, the opaque materials may be clarified. Rapid hot-drawing gives opaque materials.

EXAMPLE 21

Standard tensile specimens are prepared and tested in a standard rubber tensile testing apparatus known as the Scott machine, the jaws of which operate at a rate of 20 inches per minute. Tensile measurements are made at a constantly increasing rate of temperature, and it is noted that as the temperature increases, the tensile strength of the specimens decreases while the percentage elongation increases. The data are given in the table where it is apparent that a phase change occurs, as noted by the increase in percentage of elongation.

Table
TENSILE STRENGTH OF ACETYL PEROXIDE CATALYZED TRIFLUOROCHLOROETHYLENE

| Temperature, °C. | Tensile Strength, p. s. i. | Elongation, Per Cent |
|---|---|---|
| 35 | 5,500 | 40 |
| 45 | 4,880 | 45 |
| 55 | 4,600 | 45 |
| 65 | 3,620 | 50 |
| 75 | 3,300 | 60 |
| 85 | 3,150 | 500 |
| 100 | 1,950 | 800 |

The tensile specimens pulled at 85 and 100° C. were characterized by complete opaqueness in the stretched portion of the specimen, whereas those pulled at lower temperatures were clearer than the unstretched material. Tensile strength tests were then made on the opaque or racked sections at room temperature, and it was found that the tensile strength was approximately four times that of the initial product. X-ray diffraction patterns indicate that the opaque or racked samples are highly oriented.

EXAMPLE 22

1,1-difluoro-2,2-dichloroethylene (91 parts) is placed in a closed vessel with 0.55 part of tertiary butyl hydroperoxide. After 8 months at room temperature, the polymeric material which forms is filtered off and extracted with acetone to yield 0.6 part of polymer. The pressure may be increased to obtain a higher rate of polymerization and the temperature may also be raised somewhat, e. g. up to about 100° C.

EXAMPLE 23

50 parts by weight of trifluorochloroethylene and an equal amount of 1,1-difluoro-2,2-dichloroethylene, together with approximately 0.2 part of tertiary butyl peroxide, are charged into a closed vessel, and the mixture is allowed to remain at room temperature for approximately 2 weeks. The vessel is opened and the unreacted monomers removed and condensed, leaving a porous polymer residue.

EXAMPLE 24

About 79 parts of hexafluorocyclobutene and 69 parts of trifluorochloroethylene, together with 0.60 part of diacetyl peroxide (in a suitable solvent) are charged into a pressure vessel and polymerized at about 25° C. Polymer precipitated within 24 hours and the reaction was allowed to proceed for 1 to 2 weeks or more. The resulting polymer is somewhat similar to that obtained in accordance with Example 9.

Hexafluorocyclobutene may also be polymerized alone, but increased pressures and temperatures are desirable. Thus, for example, 37 parts of hexafluorocyclobutene are introduced into an evacuated glass-lined pressure vessel and then heated at 200–225° C. for five hours. The pressure is approximately 600-800 p. s. i. The vessel is cooled to room temperature and the pressure is released by venting the unreacted monomer. This may be condensed for use in subsequent polymerizations. Polymeric material in the form of a fine, white powder remains after the volatilization of the monomer. By longer heating, the yield of polymer can be increased.

EXAMPLE 25

About 50 parts of 1,2-dichlorotetrafluorocyclobutene-1, i. e.

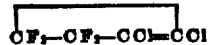

are charged into a pressure vessel together with about 50 parts of trifluorochloroethylene and 0.1–0.5% of a peroxide, such as diacetyl peroxide (in solution). The polymerization of the aforementioned substances takes place at about 25° C. for from 1 day to 2 weeks or more. Polymers having excellent properties, but somewhat less stable than those made according to Example 9, are obtained.

The dichlorotetrafluorocyclobutene may be polymerized alone under similar conditions. Polymers having desirable properties are thus produced. However, the use of trifluorochloroethylene, along with the dichlorotetrafluorocyclobutene, increases the yield of polymer and the heat stability.

EXAMPLE 26

About 50 parts of trifluorochloroethylene and about 50 parts of pentafluorochlorocyclobutene, i. e.

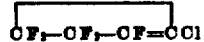

and about 0.1–0.5% of diacetyl peroxide (in solution) are charged into a pressure vessel and polymerized according to the procedures of Example 25. A polymer is obtained having excellent physical properties and being somewhat more heat stable than the product of Example 25.

The pentafluorochlorocyclobutene may be polymerized alone under the same conditions as described in Example 25 to produce a polymer having good physical properties and good thermal stability. This product is somewhat more easily fabricated than polymers of hexafluorocyclobutene.

The pentafluorochlorocyclobutene may be prepared by dechlorination (as with zinc) of 1-fluoro-1-chloro-2-dichlorotetrafluorocyclobutane. The isomer of the pentafluorochlorocyclobutene

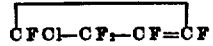

may also be used in place of part or all of the pentafluorochlorocyclobutene.

Products produced in accordance with some of the foregoing procedures such as those in Examples 1–11 are characterized by high molecular weight, crystallinity and by their ability to be drawn into fibers or filaments having high strength. The resulting fibers or filaments are characterized by a high degree of orientation as shown by an X-ray diffraction pattern. The high molecular weight of said products is evidenced by the delayed melting point. All of our products require at least 5 minutes or more to melt at the melting point thereof, whereas the low molecular weight products produced by other processes generally have an instantaneous melting point, that is to say, they melt within from about a few seconds to 2 minutes. Furthermore, prior to our invention, it was not possible to obtain anything more than a negligible yield, whereas by our processes, high yields are obtainable.

The trifluorochloroethylene polymers are crystalline and this is somewhat surprising in view of its structure. Most crystalline resins are characterized by a high degree of symmetry and this symmetry at first is apparently somewhat lacking in the trifluorochloroethylene polymer as indicated by one of the possible theoretical partial structures:

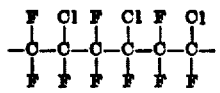

The foregoing structure would result if the molecules of trifluorochloroethylene were to unite with one another in such a way that the chlorine atoms are on every other carbon atom rather than on adjacent carbon atoms, or in other words, the arrangement would result by the addition of the molecules to one another in a "head-to-tail" fashion. Since the fluorine atom is much smaller than the chlorine atom, the presence of both would be expected to lead to a degree of dissymmetry. Moreover, the known distance between the carbon and fluorine atoms is reported to be 1.35 angstrom units, whereas the carbon to chlorine distance is reported to be 1.80 angstrom units, and this further brings about dissymmetry. However, it is also known that the introduction of a fluorine atom on a carbon atom, which already has attached to it a chlorine atom, results in pulling the chlorine atom closer to the carbon atom, thus leading to a more compact structure.

The following possible theoretical partial structure of polymerized trifluorochloroethylene would result if the molecules of trifluorochloroethylene united in such a way that the two chlorine atoms were always attached to carbon atoms adjacent to one another, or in other words, it would result from the reaction of the molecules in a "head-to-head" fashion.

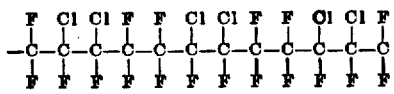

Apparently the polymerization of trifluorochloroethylene actually proceeds in such a way that the polymer contains some of the structure resulting from a "head-to-head" polymerization and some of the structure results in a "head-to-tail" polymerization. It also seems that the type and amount of each kind of polymerization are changed when the catalysts and proportions thereof are varied. The polymers made in accordance with our invention are probably similar to the super lattice structures known in metallurgy, and this is believed to account for the production of multiple split arcs in the X-ray diffraction patterns of our oriented crystalline materials.

Both the cis- and trans-1,2-dichloro-1,2-difluoroethylene would polymerize to form polymers characterized by the following repeating structural pattern:

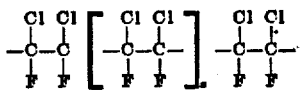

A certain amount of this same structural pattern appears to exist in some of the trifluorochloroethylene polymers, and this arises from a "head-to-head" polymerization of trifluorochloroethylene. The following structures illustrate this.

*Structure I*

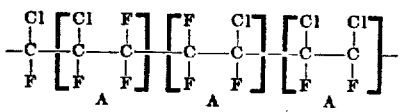

*Structure II*

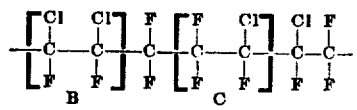

It will be noted that Structure II has the same arrangement of atoms as Structure I, but it will be observed that there is a double repeating or super lattice pattern in Structure II, one which is characteristic of trifluorochloroethylene polymers (A and C), while the other pattern is the same as the one characteristic of polymers of difluoro dichloroethylene (B).

By varying the type of catalyst, the proportion thereof, and the method of orientation, different types of products are obtained.

It is important that relatively pure materials be employed, and accordingly, the halogen substituted ethylenes used in accordance with this invention should be of a high degree of purity. This may be attained by fractionation, and in some cases, by other methods of purification. For example, it has been found to be desirable to fractionate trifluorochloroethylene to obtain a material having a boiling point of about −27° C. to −29° C. The presence of acidic materials, particularly halogen acids, appears to be undesirable and should preferably be removed prior to polymerization, as for example, by bubbling the gaseous halogen substituted ethylene through a caustic soda solution or by passing it through a soda-lime tower. Furthermore, the polymerization reaction may be carried out in the presence of an acid-absorbing substance such as soda-lime, sodium hydroxide, potassium hydroxide, calcium hydroxide, sodium carbonate, sodium bicarbonate, borax, glass, ammonium carbonate and aliphatic amine carbonates.

While the polymerization reaction may be carried out at slightly elevated temperatures and even up to approximately 107° C. or more when the critical temperature is higher, better products and higher polymers are usually obtained if the temperature is maintained in the neighborhood of 25° C. Generally, we prefer to carry out the polymerization at a temperature somewhere between 15° C. and 50° C. The reaction may also be carried out at temperatures below 15° C., but the reaction rate is so slow that such processes would probably not be economical.

The polymerization reaction is preferably carried out in a closed vessel at the pressure which the halogen substituted ethylene generates at the temperature of polymerization, which is approximately 6 atmospheres at room temperature. The polymerization may be carried out at pressures from a few atmospheres up to 100–1000 atmospheres or more. However, good yields are obtainable at a relatively rapid rate at ordinary low pressures such as those generated by the material being polymerized, and accordingly, it is generally desirable to operate at the low pressures and thus avoid the use of expensive compressors and high-pressure autoclaves.

The peroxide catalysts useful in accordance with the present invention are the diacyl peroxides (at least one acyl group of which is aliphatic), the monoacylmonoalkyl peroxides, the dialkyl peroxides and the alkyl hydroperoxides. Several of the suitable peroxides have been used in the preceding examples. Other examples of peroxides which may be used in accordance with our invention are those which are disclosed in the patents to Milas, Nos. 2,223,807, 2,176,407 and 2,298,405 and the patent to Strain, No. 2,374,789. Other peroxides which may be used are monotertiary butyl monoacetyl peroxide, monotertiary butyl monocaprylyl peroxide, tertiary butyl peroxy isopropyl carbonate, ethyl peroxy ethyl carbonate and ethyl peroxy isopropyl carbonate, dipropionyl peroxide, dibutylryl peroxide, dicyclohexyl peroxide, di-n-amyl peroxide, dimethyl peroxide, diethyl peroxide, di-isopropyl peroxide, methyl hydroperoxide, dododecyl peroxide, diactadecyl peroxide, distearic peroxide, chloro acetic peroxide, dichloro acetic peroxide, etc. The peroxides which are liquids at the temperature of polymerization are especially suitable and give good yields. The solid peroxides, or those which are explosive in pure form, may be introduced into halogen substituted ethylene to be polymerized in the form of a solution in any suitable solvent. Among the suitable solvents, some examples are the lower alkyl esters of phthalic acid such as dimethyl phthalate, diethyl phthalate, ethylene dichloride, carbon tetrachloride, chloroform, ethylene dibromide, tetrachlorodifluoro ethane, trichlorotrifluoro ethane, tetrafluorodichloro ethane, etc. The highest yields are obtained by the use of acyl peroxides having from 2 to 8 carbon atoms in each of one or more aliphatic acyl groups and the peroxides or hydroperoxides having alkyl groups containing from 1 to 8 carbon atoms. Accordingly, such catalysts are preferred.

Peroxides are catalysts for the polymerization of the halogenated hydrocarbons. The peroxides may function as generators of free radicals for the polymerization, or may act, in the case of trifluorochloroethylene, to form difluorochloro acetyl fluoride ($CF_2Cl—CO—F$) which in turn may act as a polymerization catalyst directly, or by metathesis, react with the peroxide catalyst to form chloro fluoro acetic peroxides, as for example $CH_3—CO—OOCO—CH_3 + CF_2Cl—CO—F \rightarrow$
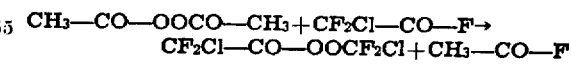

During the polymerization with peroxides, acidic compounds are generated. However, when the polymerization is carried out in the presence of basic reagents, such as soda-lime, the polymer forms normally.

Polymerization occurs with widely varying amounts of peroxide. Generally, we prefer to use from about 0.01 to about 1% of catalyst, based on the weight of the material being polymerized. While larger proportions up to about 3%, or more, may be used, this is generally undesirable since the additional catalyst does not greatly improve the physical or chemical properties of the polymer, and since the yield is not substantially improved. Furthermore, in some cases the physical and chemical properties of products deteriorate with increased amounts of catalyst, and after polymerization the undecomposed peroxide should be removed if the product is to be subjected to high temperatures or other conditions which will cause decomposition of the peroxide. Most of the peroxides decompose spontaneously, even at ordinary room temperatures over extended periods of time, and this is hastened by ultra-violet light or by sunlight. Accordingly, for most purposes the presence of a peroxide in our polymers is detrimental, and therefore, the peroxide content should be kept as low as possible.

Inasmuch as the liquid peroxides are generally unstable and decompose over a period of time, they should be assayed prior to use in order to determine the concentration of the peroxide actually present. Furthermore, many of the peroxides, such as the hydroperoxides, are ordinarily produced in solutions and contain varying amounts of alcohols. Thus, for example, tertiary butyl hydroperoxide is very difficult to obtain in relatively pure form, and it usually is mixed with some tertiary butyl alcohol. The results given in the examples are those obtained when a tertiary butyl hydroperoxide solution containing about 9.36% of available oxygen is used, or in other words, a solution containing about 52.7% of tertiary butyl hydrogen peroxide in tertiary butyl alcohol.

Polymerization promoters or modifiers may be used if desired. Suitable substances are the phenols, particularly the polyhydric phenols, and amino compounds, particularly the polyamines. Examples include phenol, resorcinol, phloroglucinol, m-phenylene diamine, urea, thiourea, melamine, thiophenol, etc. Small proportions, e. g. 0.01–1% of a polymerization promoter or modifier are usually used. These substances may increase the speed of polymerization, may change the average molecular weight, the nature of the crystallinity and they may change the relative properties of high and low molecular weight polymers.

Among the halogen substituted ethylenes which may be polymerized in accordance with the present invention, some examples are trifluorobromoethylene, trifluoroiodoethylene, 1,1-dibromo-2,2-difluoroethylene, cis- and trans-1,2-dichloro-1,2-difluoroethylene, cis- and trans-1,2-dibromo-1,2-difluoroethylene, 1,1-difluoro-2-chloro-2-bromoethylene, etc. These compounds may be made in accordance with the methods of preparation described in Traité de Chimie Organique, V. Grignard, vol. III; F. Swarts, "Halogenated Compounds." Other derivatives which may be employed in polymerization are cyclobutene derivatives, such as pentafluorochlorocyclobutenes, tetrafluorodichlorocyclobutenes. Certain of these derivatives may be secured through the pyrolysis of unsaturated fluorochloroethylenes, such as trifluorotrichloroethylene, whereas others may be secured through the reaction of difluoro dichloroethylene with trifluorochloroethylene and dehalogenation of the intermediate trifluorotrichlorocyclobutane with zinc.

The polymerization of the halogen substituted ethylenes may be carried out in solvents, in dispersions or in emulsions if desired. Generally, however, we prefer to polymerize the halogen substituted ethylenes in bulk, as described in the foregoing examples. The polymerization of the halogen substituted ethylenes in accordance with this invention is, as pointed out heretofore, carried out in the liquid phase. This is generally most conveniently accomplished by employing a polymerization temperature below the critical temperature of the (or one of the) halogen substituted ethylenes being polymerized. However, in some instances this may be accomplished at temperatures somewhat above the critical temperature of the substance (or all of the substances) being polymerized by the use of a solvent for the polymerizable material. If the reaction is carried out in emulsions or dispersions, it may be advantageous to incorporate a small proportion of a water-soluble peroxide catalyst in the aqueous phase, such as for example, hydrogen peroxide, the persulfates, the percarbonates, the perborates, etc., particularly potassium persulfate, potassium percarbonate, potassium perborate, and similar alkali metal or amine salts.

The suitable dispersing agents include talc, calcium phosphate, methyl cellulose, polyvinyl alcohol, methyl starch, polyacrylamide, dimethyl styrene-maleic acid heteropolymers, styrene-maleic acid heteropolymers, etc. When ammonium or potassium persulfate are used as catalysts, these substances may also function as dispersing agents.

If the halogen substituted ethylenes are polymerized in emulsions, either anionic or cationic emulsifiers may be used including, for example, sodium hydroxy stearate, sodium salts of long chain sulfated alcohols (such as sodium lauryl sulfate), sodium salts of organic sulfonates, including sodium salts of alkyl substituted naphthalene or benzene, sulfonic acid esters, sodium salts of the alkyl esters of sulfosuccinic acid, such as the sodium salt of the dioctyl ester of sulfosuccinic acid, dodecylamine hydrochloride, dodecylamine formate, quaternary ammonium compounds, such as trimethyl benzyl ammonium chloride, etc. Mixtures of emulsifying agents or dispersing agents may be employed and/or mixtures of emulsifying agents and dispersing agents may be used.

Dyes, pigments and filler may be mixed with our polymers if desired. Due to the marked insolubility of the polymer, dyeing is difficult. Since the polymer absorbs measurable quantities of ethyl acetate and liberates the liquid on standing it is possible to immerse the plastic or fibers in ethyl acetate solutions of oil soluble dyes to obtain colored products. However, in most instances our polymers are especially useful without the addition of other substances inasmuch as they have extremely high heat resistance, high chemical inactivity and good strength. For most purposes, the introduction of fillers is undesirable inasmuch as this will tend to reduce the desirable properties of our polymers. However, our polymers may be employed as binders for abrasives since they have such a high heat resistance and such high strength that abrasive articles produced therefrom have excellent wearing characteristics. Among the abrasives which may be mixed with our polymers a few examples are silicon carbide, aluminum oxide, silica flour, diamond dust, garnet, etc.

Our polymers are particularly suitable for extrusion in the form of ribbons, fibers or filaments, and in the form of thin films. In order to increase the strength of all of these, it is desirable that they be cold-drawn, in which case the polymers become oriented in the direction of the drawing. For easier spinning from a hot mold, the polymers may be pretreated with ortho dichlorobenzene or with 1,1-di(p-chlorophenyl)-2,2-dichloroethylene, [Cl—C$_6$H$_4$]$_2$ C=CCl$_2$. The fibers or filaments of our polymers may be used in the manufacture of felt or paper-like materials, or they may be spun into the form of threads and the latter woven into cloth. The fibers may be produced in the form of staple fiber and spun or twisted into the form of threads or it may be made as continuous fibers which may be spun or twisted into the form of threads. The filaments or twisted fibers of our polymers may also be braided into cords or rope. Tire cords made of our polymers have excellent properties because of their high strength and high heat resistance. The staple yarn may be mixed with other staples, such as cotton, rayon and wool, to form mixed staple yarn which can be twisted into threads or yarn.

Due to the resistance of filaments of our polymers to various organic and inorganic liquids, these filaments can be made into brushes for a wide variety of domestic and industrial uses. Among the domestic uses for which these brushes are of value are toothbrushes and hairbrushes, whereas industrial uses include bottle washing, screen cleaning, electroplating, wool cleaning and dry cleaning brushes. The bristles may be of uniform diameter or tapered for some applications.

Inasmuch as filaments of our polymers (either single or twisted) are inert to body fluids, since they may be made even and smooth, since they may be readily sterilized, and since they may be tied in hard knots, they are of value as surgical sutures. Since the resins are unaffected by chemical agents, they may be used to replace metal in surgery where contact with living tissue has to be established. The low water absorption and ease of fabrication makes this resin particularly attractive for dentures.

Other uses for our filaments, either single or twisted, are: as fishing lines and leaders for the manufacture of screens for various industrial uses, including filtering, as well as for protection against insects, as strings for musical instruments, etc.

Fabrics made of our polymer may be used for wearing apparel in place of cotton, wool and rayon. Due to the unique character of the filament, it is possible to utilize such fabrics in a wide variety of industrial applications, such as filtering cloths, cloths for wire wrappings, cloths for wrapping electrodes. They may also be used in laminating in the same general way that glass cloth has been used. The polymers, being chemically resistant, are not affected by the substances used as bonding materials.

In sheet form, the polymeric crystalline resin can be used for a wide variety of industrial purposes. Photographic film which is non-inflammable is a particularly desirable commodity. The polymer in sheet form is also valuable as a leather substitute and as a protective wrapping for substances or materials which are subject to deterioration due to heat, moisture or chemicals. A sheet of the polymer may be used as an adhesive to laminate the same or diverse materials, such as two plates of glass or two or more plies of wood, paper or cloth. Glass cloth laminated with sheets of polytrifluorochloroethylene at 225–250° C. results in the formation of a very tough, high temperature resistant, structural material. Transparent sheets can be employed simultaneously as a glazing and gasket material; such combinations can be used to prepare various pressure and vacuum devices more expediently and quickly since undue stress of the polymer orients and forms a tight bond leaving the unstressed portion transparent. Sheet stock can be oriented by pressing, swaging and bending.

In molded form the polymer may be used as a bearing surface. During operation in a shaft, the resin orients itself and yields a smooth bearing surface. Alternatively, the material can be packed into a bearing surface or the bearing surface can be wound with an oriented fiber. Similarly, the polymers are suitable for use in brake linings.

Moldings of our polymers are especially useful for chemically resistant containers as for cosmetics, medicines, chemicals, including acids, pharmaceuticals, etc. The polymers may also be used in the fabrication of electrical panel boards, switch or receptacle housings, parts of ignition systems for airplanes, automobiles, etc.

Our polymers may be extruded or otherwise formed into tubes which are useful as conduits for fluids.

The products obtained in accordance with this invention may be extruded onto and subsequently drawn on the wire to yield a tough, resistant, oriented coating on wire which is invaluable for winding armatures in motors. Such a coated wire possesses excellent electrical characteristics and motors wound with this wire may be operated at elevated temperatures without danger of fire since the resinous material will not burn. For the same reasons, such wire is valuable in certain resistance elements, as leads for blasting caps, etc. Moreover, the coated wire is resistant to a wide variety of organic and inorganic liquids and vapors and as such can be used under conditions where such corrosive substances are present.

Since our resinous materials are insoluble in organic liquid at ordinary temperatures, conventional coating methods employing volatile solvents are impractical. However, it is possible to grind the resin in an organic liquid medium to secure a colloidal dispersion of the resin in the organic liquid medium in much the same manner as a pigment is dispersed. Thereupon the dispersion or colloidal solution may be applied to various surfaces and the temperature of the specimen raised to about 200° C. to melt or fuse the coating into a continuous protective layer. As shown in Example 18, various protective colloids, soluble high molecular weight resinous materials and/or lacquer ingredients may be added to the organic liquid to facilitate grinding.

The polymer in finely-divided form may be "flame" sprayed through, for example, a "Schori gun." The finely-divided polymer may be obtained by grinding in a liquid medium, precipitated therefrom and screened through, for example, a 100 mesh screen.

The polymers may be admixed with various other resins by mechanical means. For example, the finely-ground polymer may be admixed with phenolformaldehyde resin in the sol stage as in an inert filler and the composition subsequently cured in a mold in order to incorporate the fluorinated polymer as an integral part of the molding composition. Other resins which may be employed as binding agents include urea-formaldehyde and melamine-formaldehyde resins. The polymers in finely-divided form may also be incorporated in moldings, coatings or films of plastics including urea-formaldehyde resins, melamine-formaldehyde resins, cellulose ester or ethers, etc., to flame-proof such materials. They may be used alone or along with antimony oxide, phosphates, chlorinated wax, etc.

Inasmuch as polymers of trifluorochloroethylene and similar halogen substituted ethylenes have a combination of extremely valuable properties, it is preferable for most purposes that no other polymerizable materials be copolymerized therewith. However, copolymers of any of the ethylenes substituted by fluorine and some other halogen, and having not hydrogen atoms, also have desirable properties and are generally crystalline substances regardless of the relative proportion of the substances being copolymerized. For some purposes copolymers of two or several of the ethylenes, which are completly substituted with halogens, such as fluorine and chlorine, may be produced, for example, by copolymerizing equal parts of trifluorochloroethylene, and any one of, or a mixture of, the dichloro difluoroethylenes.

This abandoned application is a continuation-in-part of our application Serial No. 596,082, filed May 26, 1945, entitled "Heat Resistant Polymers, Processes of Producing Same and Articles Made Therefrom."

Obviously many modifications may be made in the compositions and processes without departing from the spirit and scope of the invention as defined in the appended claims.

We claim:

1. The method of producing polymeric trifluorochloroethylene which comprises forming an admixture of trifluorochloroethylene and a small amount of diacetyl peroxide, said diacetyl peroxide being introduced into the said admixture while dissolved in dimethyl phthalate, allowing the trifluorochloroethylene to polymerize while admixed with the said diacetyl peroxide, and isolating polymeric trifluorochloroethylene from the resulting mass.

2. The method of producing polymeric trifluorochloroethylene which comprises forming an admixture of trifluorochloroethylene and diacetyl peroxide in a weight ratio of 0.5 part of the latter for each 100 parts of the former, said diacetyl peroxide being introduced into the said admixture while dissolved in dimethyl phthalate, using an amount of the said dimethyl phthalate which is sufficient to form a homogeneous solution with the diacetyl peroxide, allowing the trifluorochloroethylene to polymerize while admixed with the said diacetyl peroxide at a temperature of the order of 25° C. for a period of about 20 days, removing by distillation any monomeric trifluorochloroethylene which may be present in the resulting mass, and purifying the residual polymeric trifluorochloroethylene.

EDWARD L. KROPA.
JOHN J. PADBURY.

REFERENCES CITED

The following references are of record in the file of this patent:

UNITED STATES PATENTS

| Number | Name | Date |
| --- | --- | --- |
| 1,920,403 | Klatte | Aug. 1, 1933 |
| 1,998,309 | Clark | Apr. 16, 1935 |
| 2,071,250 | Carothers | Feb. 16, 1937 |
| 2,362,094 | Renoll | Nov. 7, 1944 |
| 2,392,378 | Hanford | Oct. 25, 1945 |
| 2,394,243 | Joyce | Feb. 5, 1946 |
| 2,396,713 | Martin | Mar. 19, 1946 |
| 2,405,008 | Berry et al. | July 30, 1946 |
| 2,420,222 | Benning | May 6, 1947 |

FOREIGN PATENTS

| Number | Country | Date |
| --- | --- | --- |
| 465,520 | Great Britain | May 3, 1937 |
| 578,168 | Great Britain | June 18, 1946 |
| 796,026 | France | Mar. 27, 1936 |

OTHER REFERENCES

Belmore et al.: Ind. Eng. Chem. 39, 338–342 (1947).

Certificate of Correction

Patent No. 2,531,134 November 21, 1950

EDWARD L. KROPA ET AL.

It is hereby certified that error appears in the printed specification of the above numbered patent requiring correction as follows:

Column 7, line 34, for "remining" read *remaining*; column 8, line 2, for the word "spices" read *species*; column 12, line 50, extreme right, for "—C" read —*C*—; column 13, lines 7 to 10, Structure I, last column thereof, for

column 14, line 23, for "actadecyl" read *octadecyl*; column 19, line 7, for "not" read *no*; line 12, for "completly" read *completely*; line 18, strike out "abandoned" before "application" and insert the same in line 19, same column, after "our";

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*